US012595436B2

(12) United States Patent
Maciel

(10) Patent No.: US 12,595,436 B2
(45) Date of Patent: Apr. 7, 2026

(54) CHEMICAL PRODUCT COMPRISING AN ANIONIC SURFACTANT, CHELANT, AND ENZYME, AND PROCESS FOR CLEANING NANOFILTRATION AND REVERSE OSMOSIS MEMBRANES

(71) Applicant: PETROLEO BRASILEIRO S.A.—PETROBRAS, Rio de Janeiro (BR)

(72) Inventor: Joselito Barbosa Maciel, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 825 days.

(21) Appl. No.: 17/699,369

(22) Filed: Mar. 21, 2022

(65) Prior Publication Data

US 2022/0348849 A1     Nov. 3, 2022

(30) Foreign Application Priority Data

Mar. 22, 2021     (BR) .......................... 1020210053925

(51) Int. Cl.
| | |
|---|---|
| *C11D 1/37* | (2006.01) |
| *B01D 65/02* | (2006.01) |
| *C11D 1/04* | (2006.01) |
| *C11D 1/14* | (2006.01) |
| *C11D 1/24* | (2006.01) |
| *C11D 3/33* | (2006.01) |
| *C11D 3/386* | (2006.01) |
| *B01D 61/02* | (2006.01) |

(52) U.S. Cl.
CPC .............. *C11D 1/24* (2013.01); *B01D 65/022* (2013.01); *C11D 1/04* (2013.01); *C11D 1/146* (2013.01); *C11D 3/33* (2013.01); *C11D 3/38618* (2013.01); *C11D 3/38627* (2013.01); *C11D 3/38636* (2013.01); *C11D 3/38645* (2013.01); *B01D 61/025* (2013.01); *B01D 61/027* (2013.01); *B01D 2321/162* (2013.01); *B01D 2321/166* (2013.01); *B01D 2321/168* (2013.01); *C11D 2111/20* (2024.01)

(58) Field of Classification Search
CPC .. C11D 1/29; C11D 1/22; C11D 1/146; C11D 3/386; C11D 3/38618; C11D 3/38627; C11D 2111/20; C11D 3/33
See application file for complete search history.

(56) References Cited

U.S. PATENT DOCUMENTS

| | | | | |
|---|---|---|---|---|
| 4,169,817 A | * | 10/1979 | Weber ................ | C11D 3/38663 |
| | | | | 510/234 |
| 6,440,911 B1 | * | 8/2002 | Bettiol .............. | C11D 3/38609 |
| | | | | 510/226 |
| 9,926,514 B1 | * | 3/2018 | Wycoff ................ | C11D 3/3715 |
| 10,023,851 B2 | * | 7/2018 | Graycar ................... | C12N 9/20 |
| 2002/0137651 A1 | * | 9/2002 | Altmann .......... | D06M 15/6436 |
| | | | | 510/276 |
| 2009/0133206 A1 | * | 5/2009 | Benjamin ............ | A61K 8/0208 |
| | | | | 15/227 |
| 2010/0234271 A1 | * | 9/2010 | Scheuing ............. | C11D 3/2065 |
| | | | | 510/465 |
| 2011/0212870 A1 | * | 9/2011 | Lant ........................ | C11D 1/72 |
| | | | | 510/323 |
| 2013/0045910 A1 | * | 2/2013 | Miracle ................... | C11D 1/29 |
| | | | | 510/276 |
| 2014/0187468 A1 | * | 7/2014 | Estell ................. | C11D 3/38627 |
| | | | | 510/392 |
| 2014/0377192 A1 | * | 12/2014 | Schaeffer-Korbylo ..................... | |
| | | | | A61K 8/66 |
| | | | | 424/50 |
| 2016/0354727 A1 | | 12/2016 | Denvir | |
| 2017/0055523 A1 | * | 3/2017 | Malchesky .............. | A61L 2/22 |
| 2017/0218312 A1 | * | 8/2017 | Panandiker .............. | C11D 3/50 |
| 2021/0395649 A1 | * | 12/2021 | Sivik ...................... | C11D 3/222 |
| 2022/0364023 A1 | * | 11/2022 | Caggioni ........... | C11D 11/0094 |
| 2023/0392018 A1 | * | 12/2023 | Qin .......................... | C11D 3/40 |
| 2024/0279627 A1 | * | 8/2024 | Bougioukou ...... | C11D 3/38681 |

FOREIGN PATENT DOCUMENTS

| | | |
|---|---|---|
| BR | 0309652 A | 11/2003 |
| WO | 03092919 A1 | 11/2003 |

* cited by examiner

*Primary Examiner* — Charles I Boyer
(74) *Attorney, Agent, or Firm* — RAPHAEL BELLUM PLLC

(57) ABSTRACT

The present invention relates to a chemical product and process for cleaning nanofiltration and reverse osmosis membranes, based on enzymatic action aiming to remove biofouling and inorganic scale quickly. The product mentioned in present invention also proposes elimination of the neutralization step of the chemical product used, given that the enzymatic action allows an adequate pH for disposal to be maintained, which fact increases the speed and efficiency of the process.

9 Claims, 1 Drawing Sheet

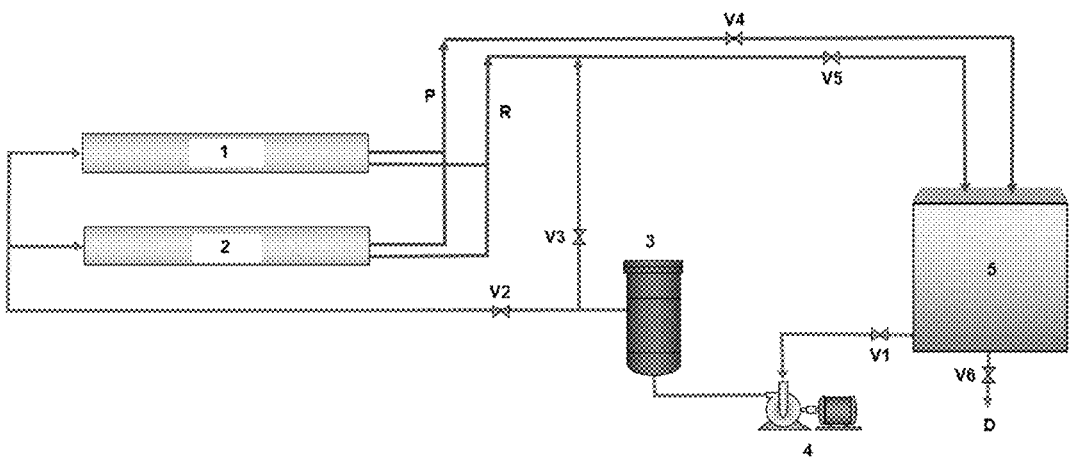

CHEMICAL PRODUCT COMPRISING AN ANIONIC SURFACTANT, CHELANT, AND ENZYME, AND PROCESS FOR CLEANING NANOFILTRATION AND REVERSE OSMOSIS MEMBRANES

FIELD OF THE INVENTION

This invention is in relation to a chemical product for cleaning nanofiltration and reverse osmosis membranes that uses enzymatic action to remove "biofouling" and inorganic scale quickly. In addition to the product, this invention proposes a process that eliminates the step of neutralizing the cleaning process used for the membranes, given that the enzymatic action allows an adequate pH to be maintained upon disposal, according to the legislation in force, which fact increases the speed and efficiency of the process.

DESCRIPTION OF THE STATE OF THE ART

The membranes are filtering means, usually produced from polymeric materials, with varying forms, pores, and sizes. The pores make the membranes useful in their various applications, both to separate particles, and to separate molecules from different molar masses. The membranes are selective barriers that act as a type of filter, providing separation in systems in which regular filters are not effective.

To increase efficiency in oil extraction, companies pump water into injection wells in order to force the liquid (oil) out. This water is taken from the ocean, and after being treated is pumped into the wells.

It is currently believed that the majority of offshore exploration platforms use nanofiltration to treat injection water. The function of nanofiltration membranes is to ensure low sulfate content in the injection water; this is because sulfate-removal technology is one of the main means of fighting microbial growth and proliferation that cause the release of $H_2S$ in wells. Sulfate is the main food for the bacterial group knows as sulfate-reducing bacteria, which metabolize sulfate from seawater and release $H_2S$. Once released inside the reservoir, $H_2S$ is pumped together with the oil to the platform, causing serious corrosion problems, as well as a high risk of toxicity for the environment and people. By reducing the sulfate content to less than 100 ppm, the action of this bacteria becomes practically negligible.

Another important function of sulfate removal is to minimize the formation of inorganic deposits. The sulfate in the water reacts with the barium and strontium present in the reservoir's formation water, forming barium sulfate and strontium sulfate deposits that decrease production capacity over time.

If these water treatment systems are not cleaned periodically, they become densely incrusted and there is also excessive biofouling. The incrustation and biofouling have a negative impact on the injection water treatment system.

In the current cleaning procedure, a cleaning solution with a pH of 11, containing detergents and chelating agents, is prepared and circulated through the membranes. Circulation and wetting cycles are run. In systems with low accumulated biofouling, each wetting step lasts approximately 4 hours; however this time may be as long as 10 hours in systems with excessive biofouling.

At the end of the circulation and wetting cycles, the solution must be neutralized and discarded. The solution must be neutralized in steps, because circulating the neutralized solution through the membranes is not recommended, as this may precipitate residue on their surfaces.

The solution must be neutralized in the tank and then discarded, and after every disposal, industrial water must be added to the tank and circulated rapidly to remove the cleaning solution present in the membranes and pipes returning to the tank, where another neutralization process will be run. The neutralization procedure is repeated until the pH of the circulating solution reaches values below 9. This is due to the regulation in force, which requires a pH between 5 and 9 for disposal.

Also in relation to ways of removing sulfate and biofouling, document US2016354727 proposes compositions for treating a membrane in a fluid system to remediate biofilm, which composition comprises: a tensoactive, an organic acid, and a neutral salt. The organic acid may be a citric acid, and the organic salt may be sodium citrate. However, the mentioned document does not discuss use of enzymes in conjunction with the chelating agents and surfactants, which makes that process slow.

Document PI 0309652-1 is in relation to a cleaning method for an industrial water system comprising the steps of supply of industrial water, and addition of the water from the mentioned industrial water system. A compound is added to the system containing a mixture of sodium chlorite or potassium chlorite, and an acid selected from the group consisting of hydrochloric acid, sulfuric acid, nitric acid, phosphoric acid, hydrofluoric acid, sulfamic acid, citric acid, formic acid, acetic acid, peracids including peracetic acid, peroxyacetic acid, peroxyformic acid, and glycolic acid. The mentioned compound is added to an industrial water system, which may be used in membrane-filtered water systems. However, the document fails to propose the use of enzymes to clean those systems, which makes the process slow.

Along the same lines, C. Whittaker et. al, in the document entitled "*Evaluation of Cleaning Strategies for Removal of Biofilms from Reverse-Osmosis Membranes*," discusses strategies to remove biofilm from membranes, among which are cited biofouling-removal strategies from the mentioned membranes, with the use of enzymes for cleaning reverse osmosis membranes. During the tests, it is believed that enzymes only present results when used with other chemical products, and the use of a wide range of enzymes is not proposed, since they are not amylases, cellulases, xylanases or lipases. However, the mentioned document does not discuss the process within the context of oil exploration.

Despite the foregoing, the state of the art fails to provide systems for cleaning and removal of biofouling, and inorganic crustations with a reduction in plant stoppage time, and it is not successful in eliminating the step of neutralization prior to disposal.

This invention therefore proposes a new formulation in which the chemical cleaning product is based on an enzymatic action that will reduce plant stoppage time, both because it is a more rapid and efficient action formulation, and also because it eliminates the neutralization step prior to disposal. The proposal described here uses enzymes, which eliminates the need to use a solution with a high pH during the cleaning procedures, which fact shows that the pH of 9 will be sufficient.

Furthermore, with a pH of 9, upon finalizing the cleaning, they may be rinsed with industrial water directly outside the system, without the need to neutralize the membrane-cleaning solution.

Therefore, in addition to gaining time, this invention provides a huge reduction in consumption of industrial water used during neutralization of the cleaning solution, as well as the acid that is also used in the neutralization.

SUMMARY DESCRIPTION OF THE INVENTION

This invention is in relation to a new formulation of a chemical product in which cleaning nanofiltration and reverse osmosis membranes is based on enzymatic action, in order to reduce plant stoppage time, both because it is a faster-acting and more efficient formulation, and because it eliminates the neutralization step before disposal.

The mentioned process is performed with the use of enzymes, which eliminates the need to use a solution with a high pH (pH 11) during the cleaning procedures, allowing the pH to be kept at 9.

Note that with a pH of 9, upon finalizing the cleaning, they may be rinsed with industrial water directly into the ocean, without the need for neutralization so that the cleaning solution can be removed from the membranes.

Therefore, in addition to gaining time, we also have a huge reduction in consumption of industrial water used during neutralization of the cleaning solution, and of the acid used in the neutralization process.

Other objectives, details, and advantages of this invention will become evident from the detailed description in the application.

BRIEF DESCRIPTION OF THE DRAWINGS

This invention will be described in greater detail below, referencing the attached FIGURE, which clearly and unrestrictedly of the inventive scope, provide examples of its realization. The designs show:

FIG. 1 contains a simplified diagram of the process for cleaning nanofiltration and reverse osmosis membranes in accordance with this invention, in which the following are shown:

1. Bank of first-stage membranes
2. Bank of second-stage membranes
3. Filter
4. Circulation pump
5. Cleaning solution tank
P—Permeate
R—Waste
D—Drain
V1, V2, V3, V4, V5, V6—Valves

DETAILED DESCRIPTION OF THE INVENTION

In the principal aspect of this invention, a chemical product is described for cleaning nanofiltration and reverse osmosis membranes, using a surfactant agent, a chelating agent, an enzymatic agent, and a buffering solution (or pH regulator).

In this principal aspect, note that the surfactant agent may be selected from among sodium dodecylbenzene sulfonate, sodium lauryl sulfate, sodium lauryl ether sulfate, or sodium stearate, in which the surfactant agent is at a concentration of 0.1 to 10%.

Also in relation to the same principal aspect, the chelating agent is ethylenediaminetetraacetic acid (EDTA), its sodic or potassic salt, or diethylenetriaminepentaacetic acid (DTPA), or its sodic or potassic salt.

In the same principal aspect, it is also noted that the concentration of the chelating agent is between 0.1 and 10%.

Also on the mentioned principal aspect, the enzymes used are amylases, cellulases, xylanases, lipases, or a mixture of these enzymes, with a total concentration between 0.1 to 5%.

A buffering solution is used (or a pH-regulating solution), which maintains and/or adjusts the pH of the solution between 7 and 9.

In a second aspect of this invention, it is noted that the nanofiltration and reverse osmosis membrane cleaning process uses the product defined above, which is comprised of a surfactant agent, a chelating agent, an enzymatic agent, and a buffering solution.

In this second aspect, it is noted that the process refers to membrane cleaning through performance of circulation and wetting cycles.

Also in this second aspect, it is noted that each wetting step lasts from 1 to 4 hours.

In the second aspect of this invention, it must also be noted that at the end of the circulation and wetting cycles the solution is discarded, eliminating the need for the neutralization process.

Thus this invention has technical advantages in the operation of sulfate-removal systems, which involves periodic stoppages for cleaning and removal of biofouling, and inorganic incrustations, as it eliminates the need for neutralization of the cleaning solution before disposal.

Thus, the nanofiltration and reverse osmosis membrane-cleaning system based on enzymatic action described in this document has an effective cleaning solution, which dispenses with the use of more aggressive chemical products, which may be discarded directly without the need to neutralize the solution.

It should be noted that although this invention has been described in relation to the attached drawing, it may be modified and adapted by experts versed in the matter, depending on the specific situation, but remaining within the inventive scope defined herein.

The invention claimed is:

1. A chemical product for cleaning nanofiltration and reverse osmosis membranes consisting of:
   A) from 0.1 to 10% of a surfactant agent selected from the group consisting of dodecylbenzene sodium sulfonate, sodium lauryl sulfate, sodium lauryl ether sulfate, and sodium stearate;
   B) a chelating agent selected from the group consisting of ethylenediaminetetraacetic acid (EDTA), sodium or potassium salt thereof, and diethylenetriaminepentaacetic acid (DTPA), or sodium or potassium salt thereof;
   C) an enzymatic agent selected from the group consisting of an amylase, a cellulase, a xylanase, a lipase, and a mixture of these enzymes; and
   D) a buffering (pH regulating) solution.

2. The product of claim 1, wherein the concentration of the chelating agent is between 0.1 and 10%.

3. The product of claim 1, wherein the total concentration of the enzymatic agents in said product is between 0.1 and 5%.

4. The product of claim 1, wherein the buffering solution (pH-regulating solution) maintains and/or adjusts the pH between 7 and 9.

5. A process for cleaning nanofiltration and reverse osmosis membranes, wherein the process uses a product as defined in claim 1.

6. The process of claim 5, wherein the process performs cleaning of the membranes through performance of circulation and wetting cycles.

7. The process of claim 5, wherein each wetting step lasts between 1 and 4 hours.

8. The process of claim 6, wherein at the end of the circulation and wetting cycles, the solution is disposed.

9. The process of claim 8, wherein after finalizing the cleaning the process includes rinsing with industrial water directly for disposal.

\* \* \* \* \*